April 23, 1946.  D. M. LIGHT  2,399,048
SNUBBER
Filed Jan. 18, 1943  2 Sheets-Sheet 1
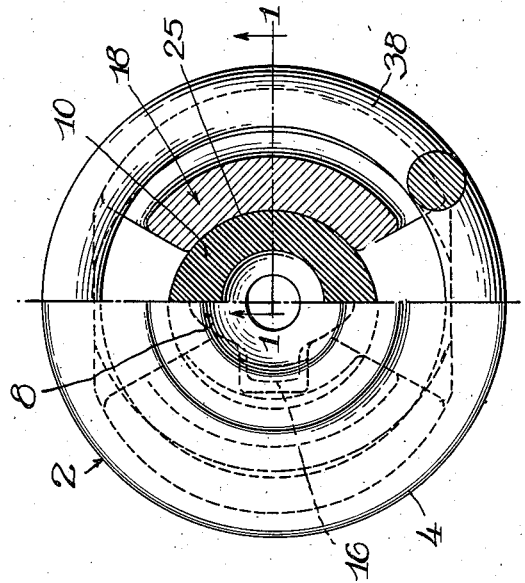
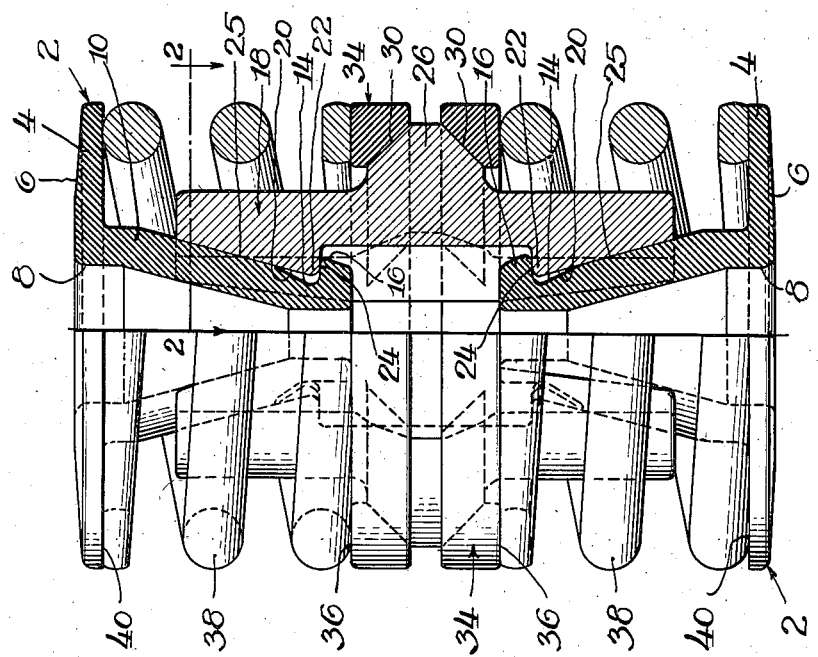
INVENTOR.
David M. Light April 23, 1946.　　　D. M. LIGHT　　　2,399,048
SNUBBER
Filed Jan. 18, 1943　　　2 Sheets-Sheet 2
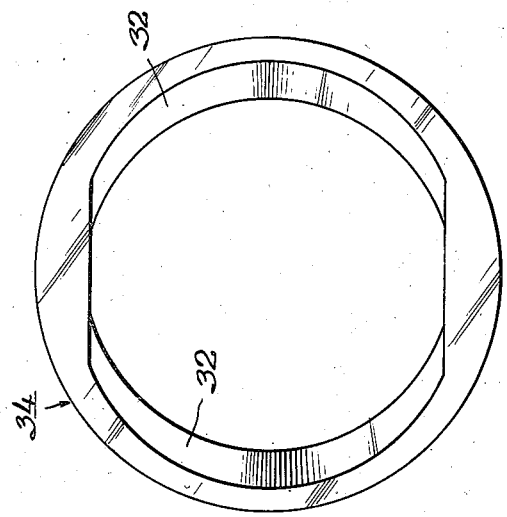
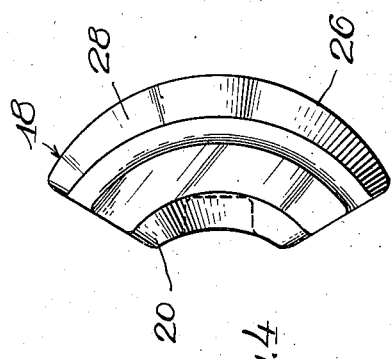
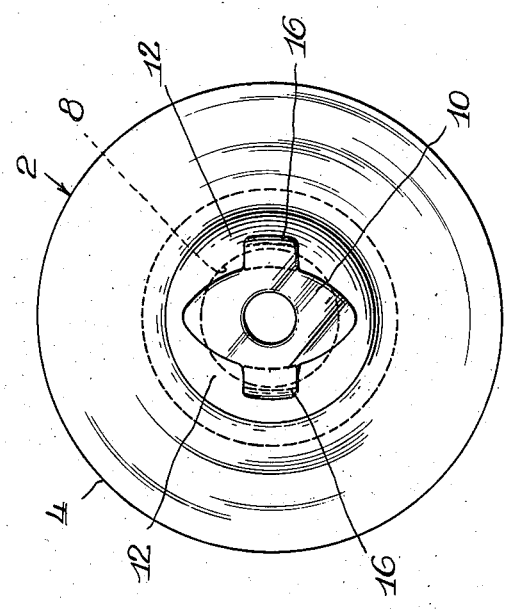
INVENTOR.
David M. Light Patented Apr. 23, 1946

2,399,048

UNITED STATES PATENT OFFICE 2,399,048

SNUBBER

David M. Light, Chicago, Ill., assignor to American Steel Foundries, Chicago, Ill., a corporation of New Jersey Application January 18, 1943, Serial No. 472,656

21 Claims. (Cl. 267—9)

My invention relates to friction absorbing devices and more particularly to such a device commonly called a snubber and utilized in conjunction with a bolster supporting coil spring group of a railway car truck, said snubber serving to prevent harmonious oscillations of the springs constituting said group.

An object of my invention is to devise a snubber in which a plurality of friction shoes are urged into frictional engagement with a pair of followers by means of a pair of wedge rings sleeved over said shoes and in oppositely directed wedge engagement therewith, a load spring being compressed between each follower and one of said wedge rings.

My invention comprehends friction shoes of novel form, each comprising a plurality of friction faces on one side thereof and a pair of oppositely directed wedge surfaces on the opposite side thereof.

My invention also comprehends friction followers of novel form, each comprising a base flange with a hollow friction stem projecting therefrom and having oppositely directed diagonal cylindrical friction faces on opposite sides thereof, and interlocking lugs on the end of said stem remote from said base.

In the drawings,

Figure 1 is a side view of my novel snubber, the left half thereof being a view in elevation and the right half thereof being a sectional view taken in the plane indicated by the line 1—1 of Figure 2.

Figure 2 is a top view of the structure shown in Figure 1, the left half thereof being a plan view and the right half thereof being a sectional view taken in the plane indicated by the line 2—2 of Figure 1.

Figure 3 is a plan view of one of the novel friction followers utilized in my device, the view being taken from the shoe engaging side of the follower. Figure 4 is a plan view of one of the friction shoes utilized in my snubber, and Figure 5 is a plan view of one of the wedge rings utilized.

Describing my invention in detail, the snubber comprises a pair of substantially identical friction followers 2, 2, each comprising a base flange 4 tapered on the outer surface thereof as at 6 to afford a rocking seat for the snubber in the customary manner and comprising an opening 8 for the reception of positioning means on an associated supported or supporting member in the customary manner.

Integrally formed with the base flange 4 is the hollow friction stem 10 comprising the diagonal friction faces 12, 12 at opposite sides thereof, said faces being preferably of cylindrical form and being relieved as at 14, 14 (Figure 1, right) to avoid the wearing of shoulders thereon. On the end of the stem 10 remote from the base 4 and adjacent the relieved areas 14, 14 may be formed a plurality of lugs or projections 16, 16 serving a purpose hereinafter more fully described.

My invention comprehends a plurality of friction shoes 18, 18 each having on one side thereof the spaced diagonal friction faces 20, 20 terminating at the adjacent edges thereof in ledges 22, 22 for abutment as at 24, 24 with the lugs 16, 16 on the associated friction stems 10, 10 to limit movement of the followers 2, 2 away from each other, as may be clearly seen in Figures 1 and 2. Each friction face 20 of each friction shoe is engaged as at 25 with the adjacent friction face 12 of the associated follower 2. On the opposite side of each shoe is a projection or lug 26 having top and bottom cylindrical wedge surfaces 28, 28 for engagement at 30, 30 with complementary surfaces 32, 32 on the spaced wedge rings 34, 34, said rings being sleeved over the shoes 18, 18 as may be clearly seen in Figure 1.

Each wedge ring 34 affords a seat as at 36 for one end of a coil spring 38. The opposite end of said spring is seated as at 40 against the base flange 4 of the adjacent follower 2.

It will be understood that if desired, cylindrical rubber-like members might be substituted for the coil springs shown, and it will also be understood that if desired, the resilient means compressed between one wedge ring 34 and the adjacent follower 2 may be of greater or less length than the resilient means compressed between the other ring 34 and the adjacent follower 2.

It will also be apparent that if desired, the character of the frictional engagement between the shoes and the followers at 25, 25 may be altered to vary the frictional characteristics of the device, as for example, by forming the faces 12, 12 of the followers and the complementary faces 20, 20 of the shoes along vertical planes. Furthermore, the engagement between the shoes and the rings at 30, 30 may be along flat or V-shaped diagonal surfaces, if desired.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, a pair of spaced followers each comprising a base and a friction stem having on opposite sides thereof a pair of oppositely directed diagonal cylindrical friction faces, a pair of lugs on the end of said stem remote from said base, and a relieved area on each face adjacent the associated lug, friction shoes each in complementary frictional engagement with a friction face on each stem and having ledges cooperating with the associated lugs to limit movement of the followers away from each other, a pair of spaced wedge members sleeved over said shoes in an oppositely directed diagonal cylindrical face engagement therewith, and resilient means under compression between each member and the adjacent base.

2. In a friction absorbing device, spaced followers each presenting a stem having friction surfaces at opposite sides thereof, friction shoes each in engagement with a surface on each stem, a pair of spaced rigid members sleeved over said shoes and in wedge engagement therewith, resilient means seated against each member and the adjacent follower, and means on the end of each stem for engagement with said shoes to limit expansion of the device.

3. In a friction absorbing device, substantially identical top and bottom followers presenting friction faces at opposite sides thereof, a plurality of substantially identical friction shoes each in frictional engagement with a face on each follower, spaced top and bottom wedge means sleeved over said shoes and in oppositely directed diagonal face engagement therewith, and resilient means between each of said top and bottom wedge means and the adjacent follower.

4. In a friction absorbing device, spaced top and bottom followers, friction shoes each in frictional engagement with both followers, spaced top and bottom wedge means sleeved over said shoes and in oppositely directed diagonal face engagement therewith, and resilient means between each of said top and bottom wedge means and the adjacent follower.

5. In a friction absorbing device, two sets of interlocked friction elements, spaced wedge means sleeved over one set of elements and in oppositely directed diagonal face engagement therewith, and resilient means compressed between each of said wedge means and an adjacent element of the other set, said other element of each set being frictionally engaged with all of the elements of the first-mentioned set.

6. In a friction absorbing device, two sets of friction elements, spaced wedge means sleeved over one set of elements and in oppositely directed diagonal face engagement therewith, and resilient means compressed between each of said wedge means and an adjacent element of the other set, each element of said other set being in frictional engagement with all elements of said first-mentioned set.

7. In a friction absorbing device, spaced followers each presenting a stem having friction surfaces at opposite sides thereof, friction shoes each in engagement with a surface on each stem, a pair of spaced rigid members sleeved over said shoes and in wedge engagement therewith, and resilient means seated against each member and the adjacent follower.

8. In a friction absorbing device, substantially identical top and bottom followers, friction shoes each frictionally engaging both of said followers, top and bottom wedge rings sleeved over said shoes and in oppositely directed diagonal face engagement therewith, and resilient means between each of said rings and the adjacent follower.

9. In a friction device, a pair of spaced springs, a follower bearing against each spring and having a portion sleeved therewithin, spaced wedge members each affording a seat for one of said springs, a friction shoe sleeved within both springs in frictional engagement with both portions, said shoe being in wedge engagement with said members and exerting thrust thereagainst radially of the device and in opposite directions axially thereof, and means for transmitting the radial thrust of said members to said followers, thereby balancing the radial thrust of said shoe against said portions.

10. In a friction absorbing device, a pair of spaced followers, spaced shoes each in frictional engagement with both followers, spaced rigid wedge means in diagonal face engagement with said shoes, resilient means abutting each follower and one of said wedge means, and means on said followers cooperating with said shoes to limit expansion of the device.

11. In a friction shoe, a substantially solid member having converging diagonal friction faces on one side thereof terminating in ledges at the adjacent edges of said faces for interlocking cooperation with associated followers, and a lug presenting oppositely directed diagonal wedge surfaces on the opposite side of said member.

12. In a friction shoe, a member having top and bottom converging diagonal friction faces on one side thereof terminating in ledges at the adjacent edges of said faces for interlocking cooperation with associated elements, and a lug on the opposite side of said member substantially midway intermediate the top and bottom thereof, said lug presenting top and bottom oppositely directed diagonal wedge surfaces.

13. In a friction absorbing device, spaced followers, each presenting friction means, friction elements in engagement with said means, spaced wedge members in oppositely directed diagonal face engagement with said elements, and resilient means between each member and the adjacent follower, each of said resilient means being sleeved over the associated friction means.

14. In a friction absorbing device, spaced followers, spaced resilient means in abutment with respective followers, each of said followers comprising a stem sleeved within the associated resilient means, spaced rigid wedge means in abutment with the adjacent extremities of the respective resilient means, a friction shoe in frictional engagement with said stems, said shoe having reversely arranged wedge surfaces in complementary wedge engagement with respective wedge means, whereby said wedge means are thrust toward each other axially of the device and are thrust in one direction radially of the device, and means for transmitting the radial thrust of said wedge means to said stems, thereby balancing the thrust of said shoe thereagainst in the opposite direction radially of said device.

15. In a friction absorbing device, a pair of followers spaced axially of the device, a friction shoe in frictional engagement with both followers, spaced rigid wedge means sleeved over said shoe and in oppositely directed diagonal face engagement therewith, resilient means abutting each wedge means and the adjacent follower, and means for transmitting radial forces acting on said wedge means to said followers.

16. In a friction absorbing device, spaced followers, a friction shoe in diagonal frictional engagement with both followers, spaced rigid wedge means sleeved over and in wedge engagement with said shoe, a resilient member extending axially of the device and abutting each wedge means and the adjacent follower, and means for transmitting forces acting on said wedge means radially of the device to said followers, thereby balancing radial forces exerted thereagainst by said shoe.

17. In a friction absorbing device, a pair of spaced followers each having a stem, spaced shoes each in frictional engagement with both stems, spaced rigid wedge means in wedge engagement with said shoes, and resilient means abutting a portion of each follower and one of said wedge means, each of said stems being telescoped within the associated resilient means.

18. In a friction absorbing device, a pair of spaced followers, spaced shoes each in frictional engagement with both followers, spaced rigid wedge rings sleeved over said shoes and in oppositely directed diagonal face engagement therewith, and resilient means abutting each follower and one of said wedge rings.

19. In a friction absorbing device, spaced top and bottom followers, friction shoes each in frictional engagement with respective followers along faces converging toward the longitudinal axis of the device, spaced top and bottom wedge means sleeved over said shoes and in oppositely directed diagonal face engagement therewith, and resilient means between each of said top and bottom wedge means and the adjacent follower.

20. In a friction absorbing device, spaced top and bottom followers, friction shoes each in frictional engagement with both followers, interlocking means on said shoes and said followers for limiting expansion of the device, spaced top and bottom wedge means sleeved over said shoes and in oppositely directed diagonal face engagement therewith, and resilient means between each of said top and bottom wedge means and the adjacent follower.

21. In a friction absorbing device, spaced top and bottom followers, friction shoes each in frictional engagement with both followers, spaced top and bottom rigid wedge rings sleeved over said shoes and in oppositely directed diagonal face engagement therewith, and a coil spring between each of said rings and a portion of the adjacent follower.

DAVID M. LIGHT.